United States Patent [19]

Mathias

[11] 4,422,852

[45] Dec. 27, 1983

[54] TEACHING AID AND PROCESS FOR TEACHING

[76] Inventor: Emily A. Mathias, 205 S. Star, El Dorado, Kans. 67042

[21] Appl. No.: 353,572

[22] Filed: Mar. 1, 1982

[51] Int. Cl.$^3$ ............................................. G09B 19/00
[52] U.S. Cl. ...................................... 434/178; 40/331; 40/617; D20/40; 283/1 R
[58] Field of Search .................. 434/178; 40/316, 322, 40/310, 331, 617, 599, 907; 206/806; D20/40; 283/1 R

[56] References Cited

U.S. PATENT DOCUMENTS

| | | | |
|---|---|---|---|
| 1,087,336 | 2/1914 | Thurber | 40/530 |
| 1,789,628 | 1/1931 | Hobbs | 40/19.5 X |
| 2,900,742 | 8/1959 | Barker et al. | 434/167 |
| 3,968,573 | 7/1976 | Poliniere | 434/153 |
| 4,216,598 | 8/1980 | Newbert | 40/617 X |

*Primary Examiner*—William H. Grieb
*Attorney, Agent, or Firm*—John H. Widdowson

[57] ABSTRACT

A teaching aid having an alongated backing including an open slot terminating into a central opening. One end of the aid has a picture of a face. Printed indicia is on the elongated backing. The process for teaching comprises pivoting the teaching aid around the doorknob shaft into a generally horizontal position such that a child can readily read all of the indicia.

2 Claims, 3 Drawing Figures

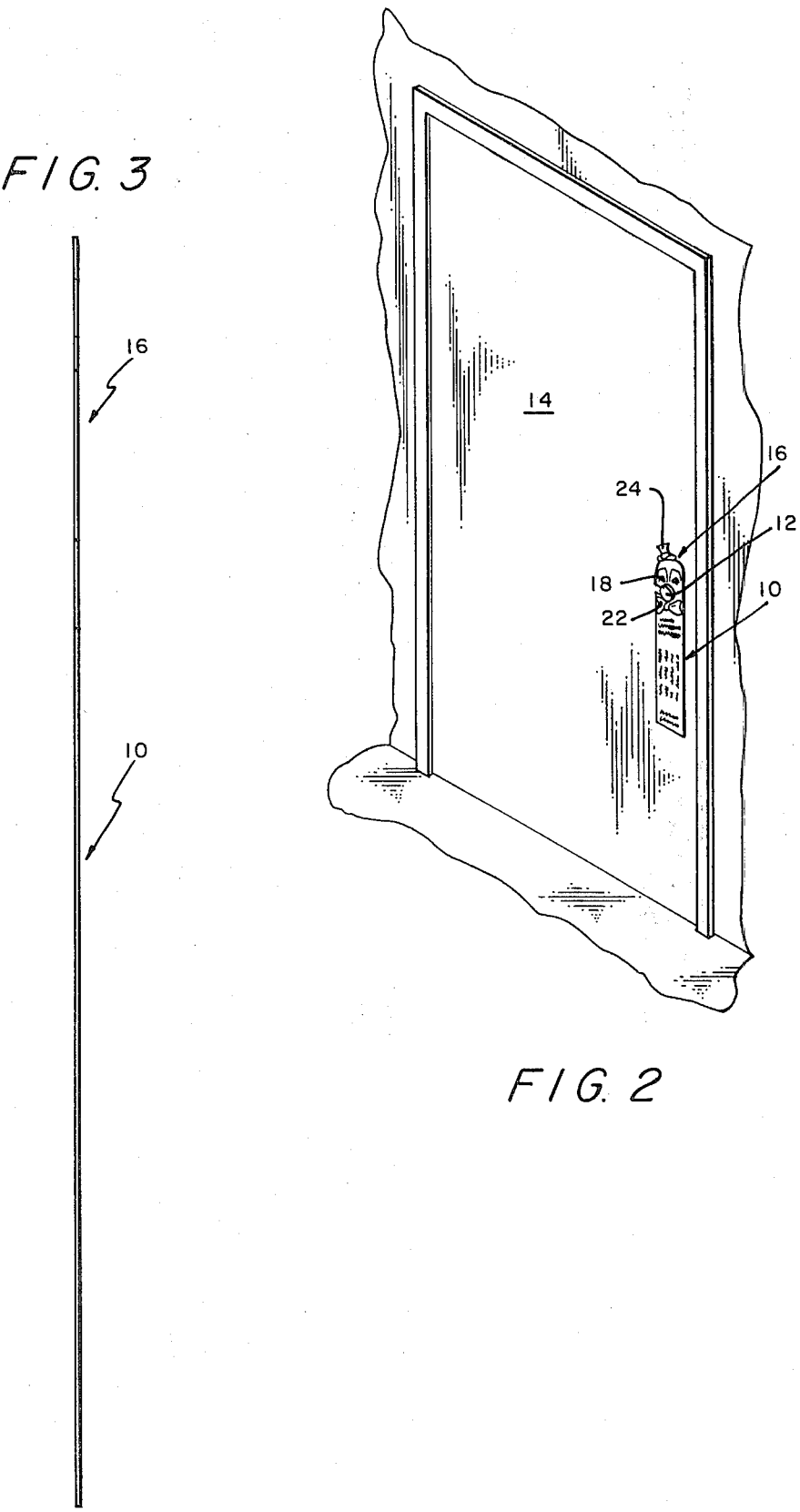

TEACHING AID AND PROCESS FOR TEACHING

BACKGROUND OF THE INVENTION

1. Field of the Invention

This invention provides a teaching aid. More specifically, this invention relates to a novel teaching aid for children that is hung on the doorknob of a child's room.

2. Description of the Prior Art

U.S. Pat. No. 1,087,336 by Thurber discloses a phonetic chart which is provided with a cord or the like, allowing the same to be hung from a suitable support and which the chart contains material for phonetic exercise. U.S. Pat. No. 3,968,573 by Poliniere discloses an information display system for a student that is mounted on an elongated backing which is provided with a hook or ring for hanging the same. U.S. Pat. No. 2,900,742 by Barker et al discloses a spelling game or the like wherein pictures and corresponding indicia are provided. None of the foregoing prior art teaches or suggests the teaching aid of this invention.

SUMMARY OF THE INVENTION

This invention accomplishes its desired objects by providing a teaching aid for hanging on the shaft of a doorknob. The aid comprises a generally elongated structural backing having an end representing pictorially a face. The backing defines an open slot having a width approximately equivalent to the outside diameter of the doorknob shaft, and terminates into a generally central opening larger than the outside diameter of the doorknob shaft to facilitate pivotation of the structural backing around the knob shaft. Erudite indicia is printed on the backing in a visual presentation form for rapid and comprehensive understanding. The process includes arranging the printed indicia such that a child has to pivot the teaching aid to a generally parallel position with respect to the horizontal in order to read readily all of the printed indicia.

It is an object of the invention to provide a novel teaching aid which is capable of easily being manufactured and positioned on the doorknob of a child's room.

These, together with the various ancillary objects and features which will become apparent as the following description proceeds, are attained by this invention, preferred embodiments being shown in the accompanying drawings, by way of example only, wherein:

BRIEF DESCRIPTION OF THE DRAWINGS

FIG. 2 is a perspective view of the teaching aid being on the shaft of a doorknob in a child's room.

FIG.3 is a side elevational view of the teaching aid.

DETAILED DESCRIPTION OF THE INVENTION

Figure 1:
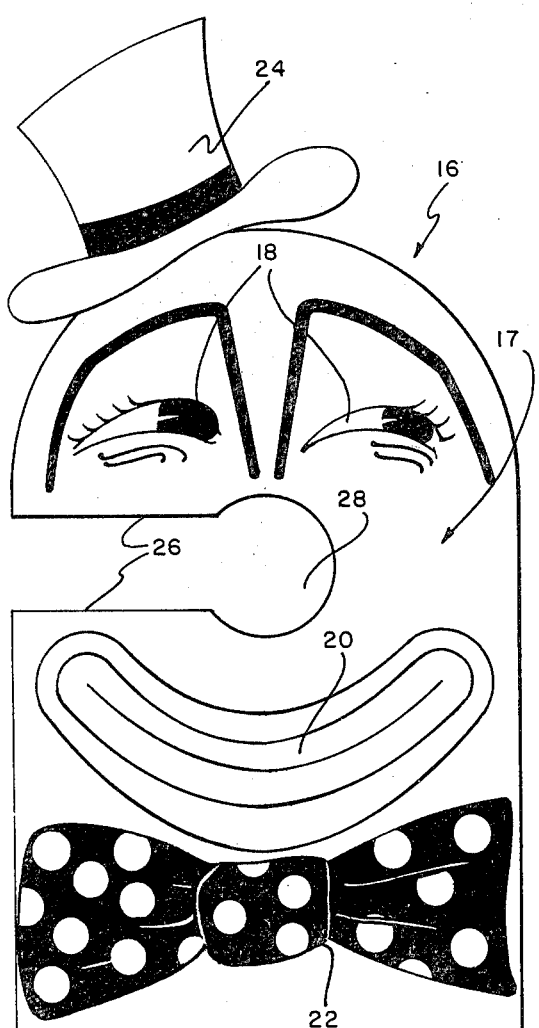
FIG. 1 is an exploded, segmented view of the teaching aid.
Figure 1:
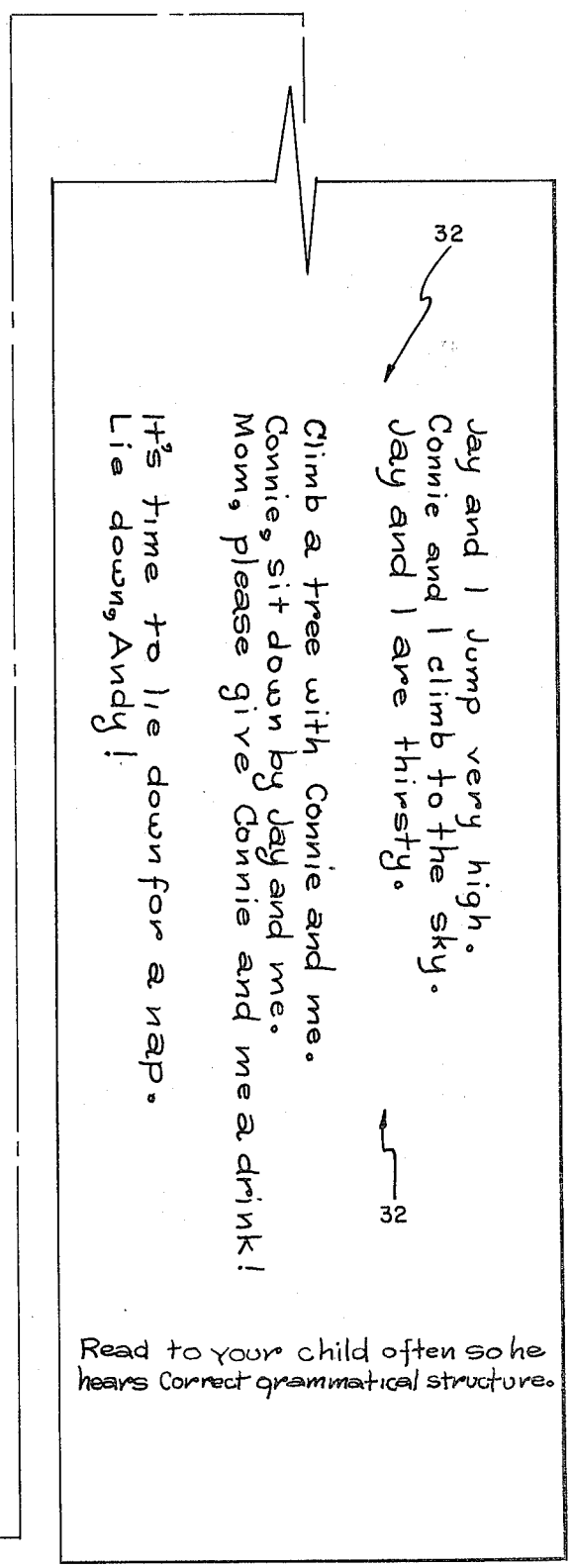

Referring in detail now to the drawings, wherein similar parts of the invention throughout the various views are identified by like reference numerals, there is seen a teaching aid, generally illustrated as 10, configured to be hung (as shown in FIG. 2) on a doorknob-shaft combination 12 of a door 14 in a child's room or the like. Aid 10, as represented in the drawings, is preferably a generally elongated structure having an end, generally illustrated as 16 (see FIG. 1), pictured with a face (generally illustrated as 17) having eyes 18—18, a mouth 20, and a bow tie 22. The end 16 is also structurally shaped to define a hat 24 that sits on top of the pictorial face 17. An open slot 26 swaths half of the face 17 and has width approximately equivalent to the outside diameter of the doorknob shaft. Slot 26 terminates into a generally central opening 28 (with respect to face 17) that is generally larger than the outside diameter of the doorknob shaft to facilitate pivotation of the structural backing around the knob-shaft combination 12. When the doorknob shaft is slid through the open slot 26 and into opening 28, the doorknob (as shown in FIG. 2) defines a nose for the face 17.

Arranged erudite indicia, as can be seen in FIG. 1, is printed in a visual presentation form for rapid and comprehensive understanding. Part of the indicia, generally illustrated as 30, is printed such that it can be read readily when the teaching aid is hung in a generally vertical upright position in the doorknob-shaft combination 12. The remaining indicia, generally illustrated as 32, is printed such that it can be read readily only if the teaching aid 10 is pivoted around the doorknob-shaft combination 12 into a generally parallel posture with respect to the horizontal. One of the primary purposes of arranging the indicias 30 and 32 in this manner is that when a child reads indicia 30, the child's curiosity is aroused to such a degree that the child becomes inquisitive as to the remaining indicia 32 such that to read readily indicia 32, the child has to pivot the teaching aid 10 to the generally parallel posture with respect to the horizontal. Pivotation can easily be accomplished because the aid 10 is preferably manufactured from any rigid material such as cardboard or polyolefin sheet, or vinyl sheet.

With continuing reference to the drawings for operation of the invention and the process for teaching with the teaching aid 10, aid 10 is hung on the shaft of the doorknob-shaft combination 12 by sliding the shaft through open slot 26 into opening 28 such that the doorknob defines the nose on the face 17. This is a feature of the invention; the doorknob as the nose of the face 17 attracts the child toward the aid 10. When the child gets close enough to the teaching aid 10 and reads indicia 30, the child's attention is obtained and the child's inquisitiveness forces the child to pivot the aid 10 to a generally horizontal posture with respect to the floor of the child's room in order to continue to read indicia 32. Thus, the feature of the doorknob defining the nose of the face 17 and the feature of the child having to rotate the teaching aid 10 to the parallel position to readily read indicia 32, are features which are unique and make this invention a novel teaching aid 10, especially for children.

While the present invention has been described herein with reference to particular embodiments thereof, a latitude of modifications, various changes and substitutions are intended in the foregoing disclosure, and it will be appreciated that in some instances some features of the invention will be employed without a corresponding use of other features without departing from the scope of the invention as set forth.

I claim:

1. A teaching aid for hanging on the shaft of a doorknob comprising a generally elongated structural backing having an end representing pictorially a face; said structural backing defining an open rectangular slot having a width approximately equivalent to the outside diameter of the doorknob shaft and terminating into a generally central opening having a diameter larger than the width of the rectangular slot and larger than the outside diameter of the doorknob shaft to facilitate pivotation of the structural backing around the knob shaft; arranged erudite indicia printed on the backing in a visual presentation form for rapid and comprehensive understanding; said doorknob shaft sliding through open slot into said central opening such that said doorknob defines a nose for said face, said indicia is printed such that a part of the indicia can be read readily when the teaching aid is hung on the shaft in a generally vertical upright position and the remaining indicia can be read readily if the teaching aid is pivoted around the knob shaft into a generally parallel posture with respect to the horizontal, the end representing pictorially the face is structurally shaped to define a hat for the head of said face, said open slot swaths part of the face which pictorially defines an end of the structural backing, and said pictorally represented face additionally comprises a pair of eyes, and a bow tie.

2. A process for teaching with a teaching aid to be hung on the shaft of a doorknob and having an elongated backing defining an open rectangular slot with a width approximately equivalent to the outside diameter of the doorknob shaft and terminating into a generally central opening having a diameter larger than the width of the rectangular slot and larger than the outside diameter of the doorknob shaft, the process comprising the steps of:

(a) printing erudite indicia on said elongated backing such that the indicia can be read readily when the backing is in a generally vertical upright position;

(b) printing additional erudite indicia on said backing such that the additional indicia can be read readily when the backing is in a generally parallel posture with respect to the horizontal;

(c) sliding the doorknob shaft through the open rectangular slot and into the central opening in order to hang the teaching aid on the doorknob.

(d) picturing a face on an end of said elongated backing; and (e) pivoting the teaching aid around the doorknob into a generally parallel posture with respect to the horizontal such that the additional indicia of step (b) can be read readily.

* * * * *